3,533,679
LENS WITH VARIABLE FOCAL LENGTH

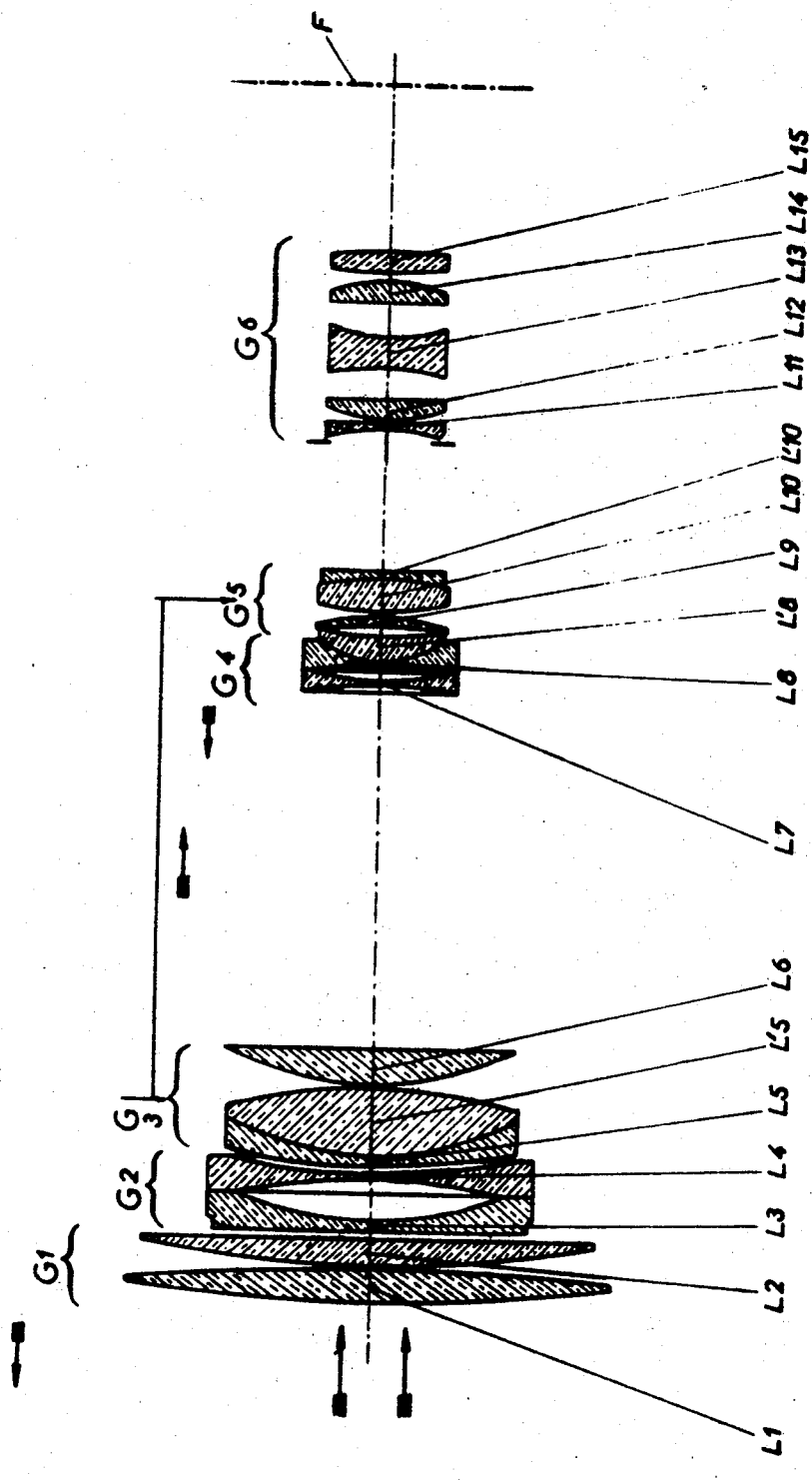

Jean Michel Baluteau, Livry-Gargan, France, assignor to Societe d'Optique, Precision, Electronique et Mecanique, Sopelem, Paris, France, a company of France
Filed Jan. 16, 1968, Ser. No. 698,310
Claims priority, application France, Jan. 25, 1967, 92,376
Int. Cl. G02b 15/18
U.S. Cl. 350—186                                  1 Claim

ABSTRACT OF THE DISCLOSURE

A high-ratio lens with variable focal length and six units. The first unit is movable for focusing, the third, fourth and fifth units are movable for modification of the focal length, the fourth unit moves in the opposite direction from the two units which are on either side of it and are interconnected, each of the first five units consists of two elements of similar powers, and the focal length of the third unit is greater than that of the fifth, the units movable for modification of the focal length each comprising a cemented element and a single element.

---

The invention relates to a lens with variable focal length, more particularly a cinematographic or photographic taking lens.

The object of the invention is to provide a lens with a high ratio—of the order of 10—of its extreme focal lengths, the various aberrations being very well corrected, the aperture of the system (constant for all focal lengths) being wide and the angle of view for the shortest focal length being approximately 60°. This high performance lens will be described below.

The invention consists of a variable focal length lens comprising an adjusting system followed by a convergent rear lens, the adjusting system comprising a first, convergent unit for distance focusing, a second, divergent unit, a third, convergent unit, a fourth, divergent unit and a fifth, convergent unit, the third and fifth units having substantially identical movements and the fourth unit having movements in the opposite direction substantially proportional to the movements of the third and fifth units, characterised in that, the absolute value for the focal length $f_4$ of the fourth unit being assumed to be unity, and its algebraic value being negative, the algebraic focal lengths $f_1$, $f_2$, $f_3$ and $f_5$ respectively of the first, second, third and fifth units are such that:

$$-2.3 f_4 < f_1 < -6 f_4$$

$$2 f_4 < f_2 < f_4$$

$$3.15 f_4 < \frac{f_1 \times f_2}{f_1 + f_2} < 2.4 f_4$$

$$-1.65 f_4 < f_3 < -1.90 f_4$$

$$-1.45 f_4 < f_5 < -1.67 f_4$$

The invention will now be described in more detail with reference to a particular embodiment given by way of example and shown in the drawing.

The single figure is a longitudinal section through a lens embodying the invention, the light arriving from the left.

The optical system shown in the drawing comprises six lens element units respectively numbered $G_1$, $G_2$, $G_3$, $G_4$, $G_5$, $G_6$ in the direction of the incident light. The units $G_1$, $G_3$, $G_4$ and $G_5$ are movable and the units $G_2$, $G_6$ are fixed.

The first unit is movable solely for cousing on the various positions which the subject filmed may occupy.

The movements of the units $G_3$, $G_4$, $G_5$ are designed to give a variable focal length while keeping the final image on the film F stationary.

The units $G_3$ and $G_5$ carry out the same movement and may therefore be rigidly connected to the same component. The direction of this movement is the same when the focal length of the assembly varies from one of its limits to the other. The direction of the incident light corresponds to a reduction in this resulting focal length.

The movement of the unit $G_4$ is always in the opposite direction from the preceding movement.

The movements of the assembly comprising the units $G_3$ and $G_5$ and of the unit $G_4$ may be effected by simple known means, for example cams, slides or screws.

The units $G_1$, $G_3$, $G_5$, $G_6$ are convergent, the units $G_2$, $G_4$ are divergent.

If the focal length of the fourth unit is equal to $-1$, the focal lengths $f_1$, $f_2$, $f_3$ and $f_5$ of the units having the corresponding indices give the following inequalities:

$$-2.3 f_4 < f_1 < -6 f_4$$

$$2 f_4 < f_2 < f_4$$

$$3.15 f_4 < \frac{f_1 \times f_2}{f_1 + f_2} < 2.4 f_4$$

$$-1.65 f_4 < f_3 < -1.90 f_4$$

$$-1.45 f_4 < f_5 < -1.67 f_4$$

Each of the units $G_1$, $G_2$, $G_3$, $G_4$ and $G_5$ consists of two elements of similar powers.

Unit $G_1$ contains two simple, convergent lens elements of which the first faces are the most convergent.

The second unit contains two simple, divergent lens elements.

Unit $G_3$ comprises a cemented double element and a single lens element. The index of the first lens element in the double element is greater than that of the second.

Unit $G_4$ consists of a simple, divergent lens element followed by a cemented double element.

The fifth unit contains a single element and a cemented double element in which the index of the second lens element is greater than that of the first.

The aperture diaphragm is after the fifth unit and may be either in front of or inside the sixth unit.

EXAMPLE

We shall now give an example of a lens embodying the invention, with a focal length varying from 12 mm. to 120 mm., with an aperture f2 and capable of covering a 16 mm. film.

In the following table, $n_d$ designates the refractive index for the line $d$ and $\nu$ is the scattering factor.

| Radii of curvature | | Lens thicknesses and intervals between lens elements | $n_d$ | $\nu$ | Effective diameters of lens elements |
|---|---|---|---|---|---|
| $G_1$ { $L_1$ | { +246.92<br>{ −450.78 | 7 | 1.69738 | 56 | 85 |
| | | 0.01 | | | |
| $L_2$ | { +170.63<br>{ +4511 | 5.5 | 1.69930 | 30.1 | 79 |
| | | ¹ 0.2 | | | |
| $G_2$ { $L_3$ | { +856.17<br>{ +61.11 | 1.5 | 1.69738 | 56 | 56 |
| | | 8.45 | | | |
| $L_4$ | { −117.2<br>{ +173 | 1.5 | 1.69738 | 56 | 50 |
| | | Variable | | | |
| $L_5$ | { +184.65<br>{ +55.04 | 1 | 1.78723 | 24.4 | 50 |
| $G_3$ { $L_{15}$ | { --------<br>{ −97.75 | 12 | 1.62086 | 60 | |
| | | 0.01 | | | |
| $L_6$ | { +57.526<br>{ +2954 | 6.5 | 1.69738 | 56 | 50 |
| | | Variable | | | |
| $L_7$ | { −150.7<br>{ +47.314 | 0.8 | 1.62030 | 60.2 | 25 |
| | | 2.4 | | | |
| $G_4$ { $L_8$<br>$L_8$ | { −103.06<br>{ +18.544 | 0.7 | 1.69774 | 55.7 | 25 |
| $L_{18}$ | { --------<br>{ +65.15 | 4 | 1.73118 | 28.3 | 22 |
| | | Variable | | | |
| $L_9$<br>$L_9$ | { −167.15<br>{ −37.95 | 2 | 1.51610 | 64.2 | 22 |
| | | 0.01 | | | |
| $G_5$ { $L_{10}$ | { +44.50<br>{ −45.493 | 6.5 | 1.62008 | 60.2 | 22 |
| $L_{110}$ | { --------<br>{ +754.2 | 0.8 | 1.69866 | 30.1 | 22 |
| | | Variable | | | |
| $L_{11}$ | { −38.55<br>{ +692.2 | 1 | 1.54125 | 47.6 | 20 |
| | | 0.1 | | | |
| $L_{12}$ | { +27.514<br>{ +983.60 | 4.23 | 1.744 | 45 | 19 |
| | | 5.36 | | | |
| $L_{13}$ | { −47.40<br>{ +25.611 | 4.04 | 1.73150 | 28 | {14.5<br>{13.5 |
| $G_6$ | | 6.61 | | | |
| $L_{14}$ | { −182.77<br>{ −26.238 | 4.34 | 1.69675 | 56 | 18 |
| | | 0.1 | | | |
| $L_{15}$ | { +44.1<br>{ −143.6 | 3.5 | 1.69675 | 56 | 18 |

¹ For object at infinity.

The "tirage optique," i.e. the distance between the lens element $L_{15}$ and the film F is equal to 27.34.

In the example given above, the focal lengths of the units $G_1$, $G_2$, $G_3$, $G_4$, $G_5$ are:

$f_1 = +121.14$
$f_2 = -46.46$
$f_3 = +51.84$
$f_4 = -28.72$
$f_5 = +45.12$

The following table gives three series of values for the variable intervals:

| Interval $G_2G_3$ | Interval $G_3G_4$ | Interval $G_4G_5$ | Interval $G_5G_6$ |
|---|---|---|---|
| 0.909 | 63.243 | 1.787 | 32.030 |
| 15.174 | 33.982 | 31.048 | 17.765 |
| 29.439 | 1.247 | 63.783 | 3.5 |

The diaphragm is 1 mm. in front of the sixth unit.

Obviously, the invention is not restricted by the details of the embodiment just described. These details may be modified without exceeding the scope of the invention.

I claim:

1. A variable focal length lens comprising an adjusting system followed by a convergent rear lens, the adjusting system comprising a movable first convergent unit for distance focusing, a second divergent unit, a third convergent unit, a fourth divergent unit and a fifth convergent unit, the third and fifth units having substantially identical movements and the fourth unit having movements in the opposite direction substantially proportional to the movements of the third and fifth units, the focal length $f_1$, $f_2$, $f_3$, $f_4$ and $f_5$ respectively, of the first, second, third, fourth and fifth units being:

$f_1 = +121.14$,  $f_2 = -46.46$,  $f_3 = +51.84$,  $f_4 = -28.72$,
$f_5 = +45.2$.

References Cited

UNITED STATES PATENTS

| 3,192,829 | 7/1965 | Yamaji | 350—186 |
| 3,346,320 | 10/1967 | Macher | 350—184 |

FOREIGN PATENTS 1,028,353  5/1966  Great Britain.

JOHN K. CORBIN, Primary Examiner

U.S. Cl. X.R.

350 216

UNITED STATES PATENT OFFICE

CERTIFICATE OF CORRECTION

Patent No. 3,533,679      Dated October 13, 1970

Inventor(s) Jean Michel Baluteau

It is certified that error appears in the above-identified patent and that said Letters Patent are hereby corrected as shown below:

Column 2, line 7, "cousing" should be --focusing--. Column 3, In the Table, line 19, "$L_{15}$" should be --$L'_5$--; Line 25, "$L_8$" should be --$L'_8$--; Line 27, "$L_{18}$" should be omitted; Line 33, "$L_{110}$" should be --$L'_{10}$--; Line 39 (Column 5), "14.5" should be --14.6--.

SIGNED AND SEALED
DEC 22 1970

(SEAL)
Attest:

Edward M. Fletcher, Jr.
Attesting Officer

WILLIAM E. SCHUYLER, JR.
Commissioner of Patents